United States Patent [19]

Childers

[11] Patent Number: 5,366,159

[45] Date of Patent: Nov. 22, 1994

[54] AUTOMATIC LAWN AND GARDEN FEEDING APPARATUS

[76] Inventor: Lance L. Childers, 1582 Laurel St., Gridley, Calif. 95948

[21] Appl. No.: 928,858

[22] Filed: Sep. 14, 1992

[51] Int. Cl.$^5$ .............................................. B05B 7/26
[52] U.S. Cl. .................................. 239/310; 222/249; 137/564.5
[58] Field of Search ..................... 239/310, 322; 222/129.2, 136, 249; 91/433, 442, 468, 462; 417/392; 137/564.5

[56] References Cited

U.S. PATENT DOCUMENTS

| | | | |
|---|---|---|---|
| 3,570,508 | 3/1971 | Boggs | 137/2 |
| 4,406,406 | 9/1983 | Knapp | 239/322 |
| 4,449,543 | 5/1984 | Greene, Jr. | 137/564.5 |
| 4,547,134 | 10/1985 | Hirvonen | 417/392 |
| 4,635,830 | 1/1987 | Wehr et al. | 239/322 |
| 4,638,924 | 1/1987 | Newsom | 222/249 |
| 4,651,765 | 3/1987 | Beth | 137/564.5 |
| 4,846,214 | 7/1989 | Strong | 137/268 |
| 4,852,802 | 8/1989 | Iggulden et al. | 239/310 |
| 4,966,306 | 10/1990 | Credle, Jr. et al. | 222/129.2 |
| 5,088,517 | 2/1992 | Bersch | 137/564.5 |
| 5,143,257 | 9/1992 | Austin et al. | 222/129.2 |

*Primary Examiner*—Andres Kashnikow
*Assistant Examiner*—Christopher G. Trainor

[57] ABSTRACT

An automatic fertilizing apparatus which injects fertilizer directly into the waterstream of a sprinkler system. Each time the sprinkler system is activated, a predetermined amount of fertilizer is dispensed into the waterstream. The apparatus can be controlled to dispense fertilizer only thru sprinkler lines determined by the user.

1 Claim, 3 Drawing Sheets

AUTOMATIC LAWN AND GARDEN FEEDING APPARATUS

BACKGROUND

1. Field of Invention

This invention relates to applying fertilizer and more particularly to injecting the fertilizer into the water supply of an automatic sprinkler system.

2. Description of Prior Art

Homeowners are continually having to fertilize their lawns and gardens to replace the nutrients which the lawn and plants take out. This is usually done by spreading a dry fertilizer, or spraying on a liquid fertilizer by hand. This is very time consuming and bothersome for the typical homeowner. It is also expensive to hire a lawn service to do the fertilizing.

U.S. Pat. No. 3,570,508 to John A. Boggs and Billy R. Boggs (1971) most closely resembles the purpose and function of my apparatus. The Boggs fertilizer injector works by means of a prop driven pump. This pump is placed in the water supply piping to the sprinklers. This will restrict the flow, and reduce the amount of water to the sprinklers. There is a need to get the pumping mechanism out of the water supply. The Boggs system was designed for large commercial use. It would be very expensive for the private homeowner, even if it could be down-sized to fit the private sprinkler systems.

The private home sprinkler system consists of many sprinkler lines. Some of these sprinkler lines are for the lawn and some are for the flowerbeds. A fertilizer which is good for the lawn may be harmful to flowering or broadleaf plants. The Boggs system continually injects fertilizer when the water is flowing. It cannot distinguish between the different sprinkler lines.

OBJECTS AND ADVANTAGES

According to the automatic lawn and garden feeding apparatus, a predetermined amount of fertilizer is injected into the water supply of an automatic sprinkler system.

An object of this invention is to apply fertilizer to lawns and gardens.

Another object is to inject fertilizer directly into irrigation water.

Another object is to inject fertilizer into irrigation water with a mechanism which automatically stops if the waterflow should stop.

A further object is to provide a fertilizer injector that will only require the same electrical power which is already supplied to an automatic sprinkler systems control valves.

Still further objects are to achieve the above with a device that is sturdy, reliable, compact, inexpensive to manufacture, and compatible with existing sprinkler systems.

Still further objects are to achieve the above with a method that does not require skilled people to install and operate.

The specific nature of the invention, as well as other uses and advantages will become clear with the following description and drawings.

Figure 1:
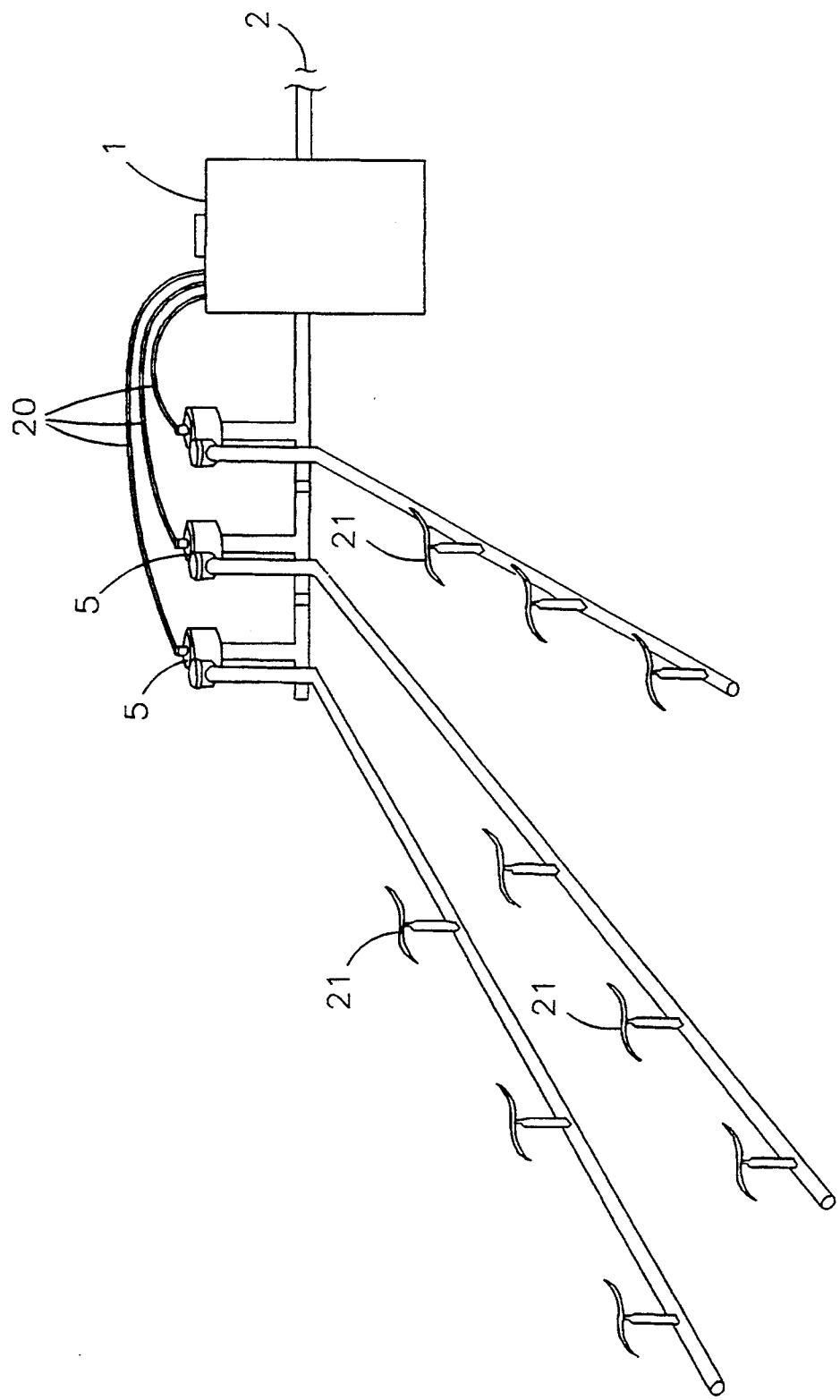
FIG. 1 is a schematic of a typical system embodying the automatic lawn and garden feeding apparatus.
Figure 2:
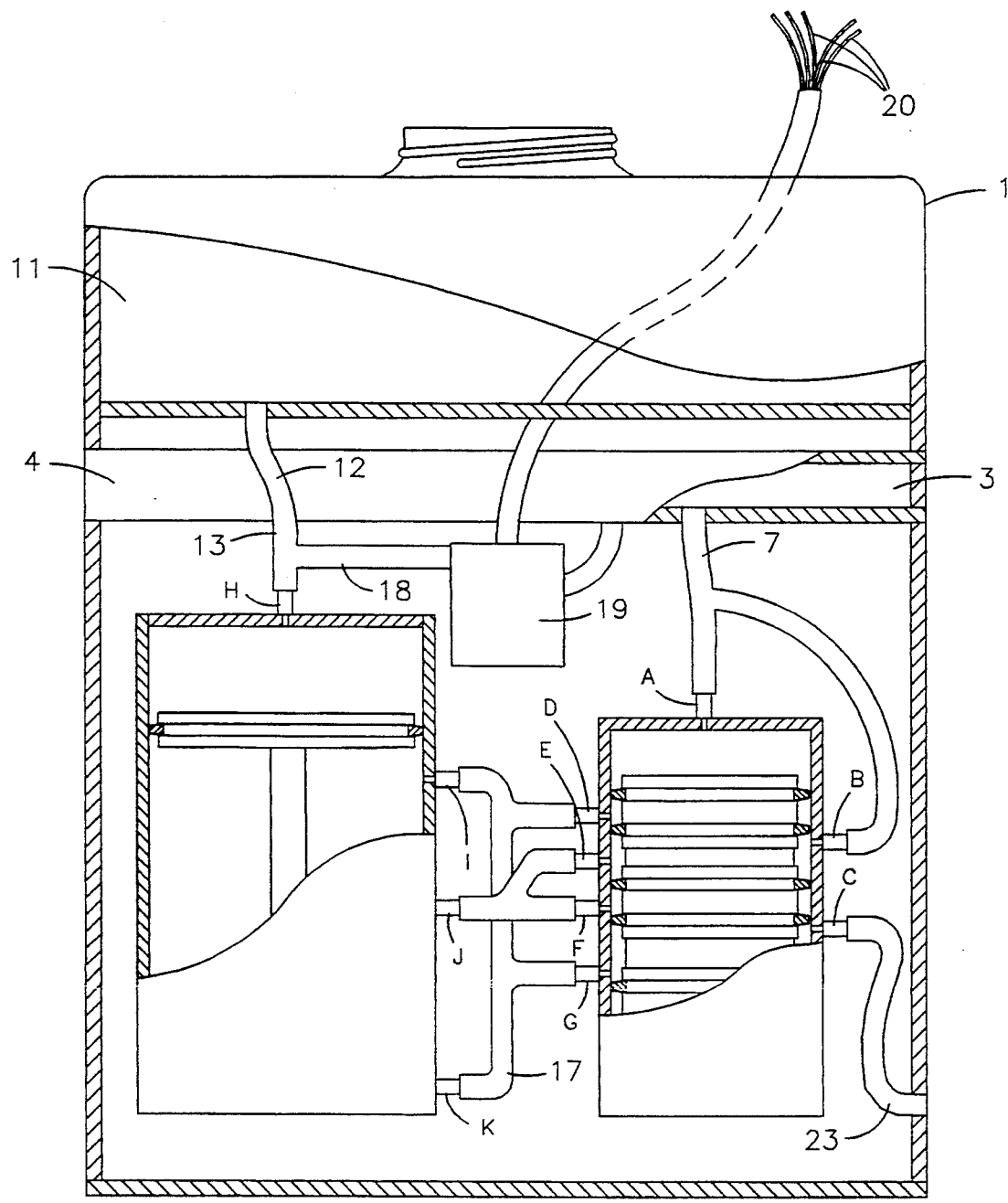
FIG. 2 is a sectional view of the complete automatic lawn and garden feeding apparatus.
Figure 3:
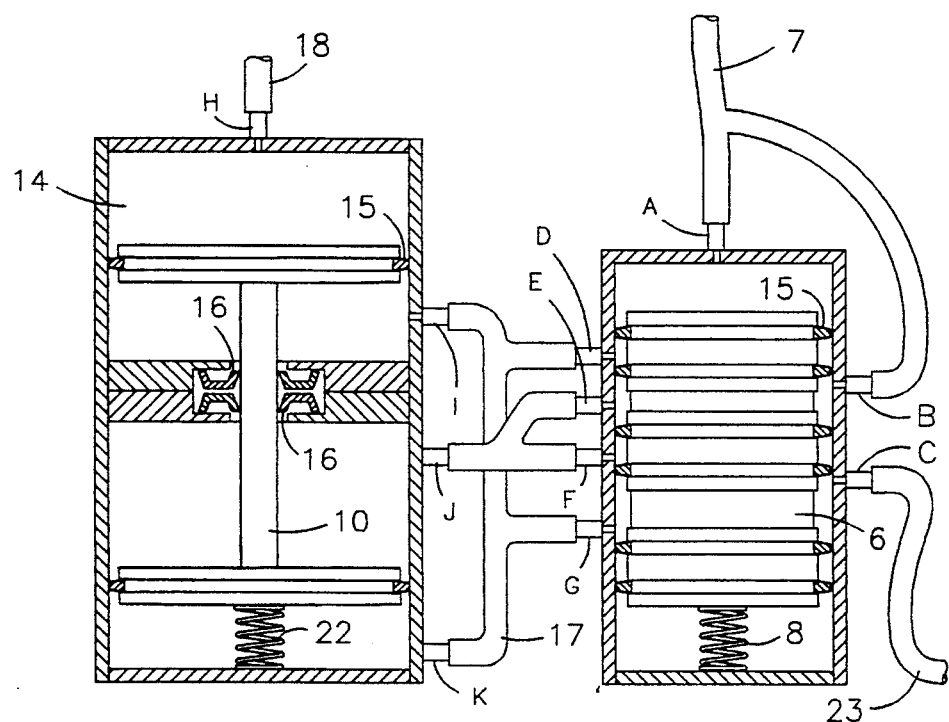
FIG. 3 is a sectional view of the automatic lawn and garden feeding apparatus.
Figure 4:
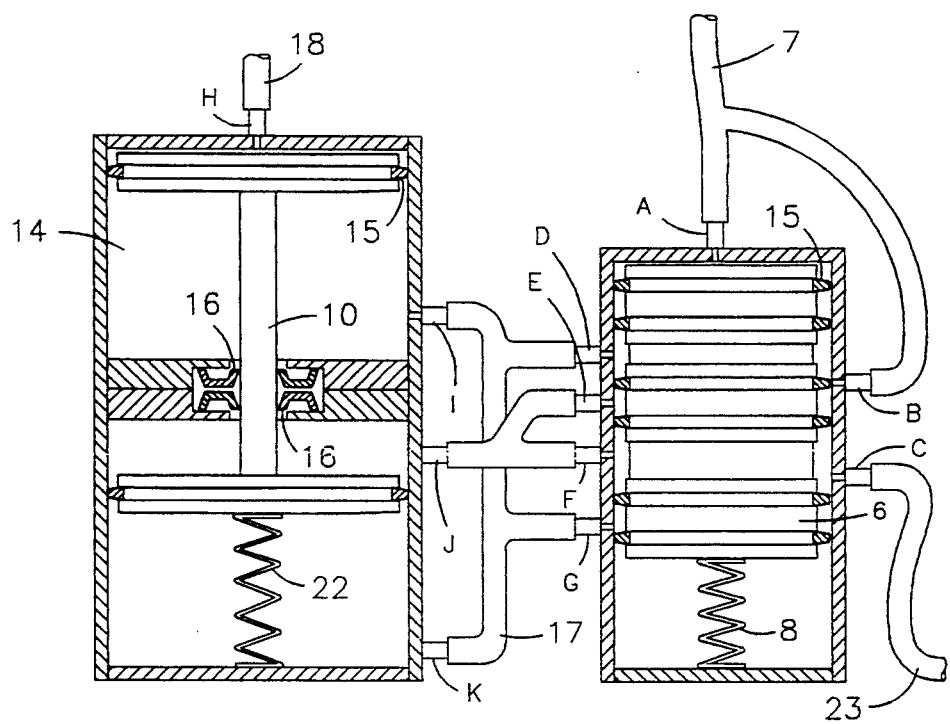
FIG. 4 is a sectional view of the automatic lawn and garden feeding apparatus.

Although we speak of fertilizer it will become apparent that other liquids such as pesticides, hormones, herbicides and fungicides can be used.

Referring to the drawings, water is supplied to the automatic lawn and garden apparatus 1 through the main waterline 2. Water flows through the water inlet port 3 and water outlet port 4 to the automatic sprinkler system. Water flows through tube 7 to the control piston assembly at port A and port B. When the sprinkler system is in the off mode, the water pressure in the main water line is strong enough to make the control piston 6 compress spring 8. This allows the water from tube 7 to flow through port E into tube 9 and through port J of the injection piston assembly. Port F is sealed and will not let the water in tube 7 flow through it. The water flowing into port J will push the piston down, compressing spring 22. This will draw fertilizer fluid from reservoir 11 through tube 12, past check-valve 13, through port H to chamber 14 of the injection piston assembly. The seals 15 prevent fluid from bypassing the piston heads. The seals 16 prevent fluid from bypassing the piston rod 10. Port I, port K, port G and port C at this time will allow any air or fluid trapped in the injection piston assembly to be vented out through tube 17 and tube 23.

When the sprinkler system is in the on mode and water is flowing through the sprinkler heads 21, the water pressure in tube 7 is greatly reduced. The water pressure in tube 7 is reduced enough to allow spring 8 to expand and push piston 6 to the top of the piston cylinder. This allows the water from tube 7 to flow through port B, through port D, through tube 17, through port I and port K into the injection piston assembly. The water pressure, with the help of spring 22, pushes the injection piston upward, forcing the fertilizer fluid through port H into tube 18. Check-valve 13 blocks the fertilizer fluid from returning to the fertilizer reservoir 11. Solenoid valve 19 is attached to the sprinkler system control valve solenoids 5 by means of multistrand wire 20. A wire is only hooked up to the particular sprinkler lines in which fertilizer is wanted to be applied. When the sprinkler system control valve 5 is energized, so is solenoid valve 19. This allows the fertilizer fluid in tube 18 to be injected into the main water stream and flow through water outlet port 4 to the sprinkler heads 21 and thus onto the lawn or garden. If a particular line of sprinklers is in a place which does not require fertilizer, then control wires 20 will not be connected to that particular solenoid 5. This will keep the automatic lawn and garden feeding apparatus solenoid valve 19 closed and prevent the flow of fertilizer to the sprinklers 21.

I claim:

1. An apparatus for automatically dispensing a controlled amount of fertilizer into a water supply line of a sprinkler system, said apparatus comprising:

A. a non-pressurized reservoir for holding the fertilizer;

B. an injection assembly comprising an injection piston, said injection piston being movable from a first position to a second position within said injection assembly to transfer a predetermined amount of said fertilizer from said reservoir to said injection assembly, and movable from said second position to said first position to inject said fertilizer into said water supply line;
C. a control piston assembly comprising a control piston for controlling movement of said injection piston between said first and second positions;
D. a means for connecting said reservoir to said injection piston assembly to allow said fertilizer to be transferred to said injection piston assembly, said connecting means comprising a check valve to prevent the fertilizer from flowing back into the reservoir;
E. a means for connecting said control piston assembly to said water supply line;
F. a means for connecting said control piston assembly to said injection assembly to control the movement of said injection piston; and
G. a means for connecting said injection piston to said water supply line to allow fertilizer to be injected into said water supply line, said connecting means comprising a solenoid valve to control the flow of fertilizer into the water supply line.

* * * * *